United States Patent [19]

Kulju et al.

[11] Patent Number: 4,800,386

[45] Date of Patent: Jan. 24, 1989

[54] METHOD OF AND APPARATUS FOR COUNTING OBJECTS

[75] Inventors: Hannu Kulju, Hyvinkää ; Alpo O. Värri, Tampere, both of Finland

[73] Assignee: Kone Elevator GmbH, Baar, Switzerland

[21] Appl. No.: 53,866

[22] Filed: May 26, 1987

[30] Foreign Application Priority Data

May 30, 1986 [FI] Finland ................. 862325

[51] Int. Cl.$^4$ ............................................. G10S 13/86
[52] U.S. Cl. ....................................... 342/61; 342/106; 367/95; 187/131
[58] Field of Search ...................... 342/92, 95, 99, 106, 342/27, 110, 28, 114; 367/90, 96, 93, 94; 187/104, 131; 414/675

[56] References Cited

U.S. PATENT DOCUMENTS

| | | | |
|---|---|---|---|
| 3,900,869 | 8/1975 | Jensen | 342/106 |
| 4,112,419 | 9/1978 | Kinoshita et al. | 367/94 |
| 4,195,289 | 3/1980 | Cole | 340/534 |
| 4,225,858 | 9/1980 | Cole et al. | 367/94 X |
| 4,536,764 | 8/1985 | Freeman | 342/91 |

FOREIGN PATENT DOCUMENTS 2072987 10/1981 United Kingdom ................. 342/28

Primary Examiner—Thomas H. Tarcza
Assistant Examiner—Tod Swann
Attorney, Agent, or Firm—Sughrue, Mion, Zinn, Macpeak, and Seas

[57] ABSTRACT

A method of and apparatus for counting objects present within a predetermined area, by detecting acceleration and deceleration of the objects employ at least one Doppler radar to sense the movements of the objects by monitoring the Doppler frequencies of signals reflected from the objects, amplifying the Doppler signal reflected from each of the objects to provide an amplified signal, effecting an automatic gain control of the amplified signal to provide a signal of substantially constant strength independent of the distance and size of the respective object, detecting a frequency variation of the constant strength signal as an indication of change in the speed of movement of a respective one of the objects, determining whether the constant strength signal represents an acceleration or deceleration of the respective object, and correspondingly modifying a count representing the number of the objects in the predetermined area.

10 Claims, 2 Drawing Sheets

METHOD OF AND APPARATUS FOR COUNTING OBJECTS

FIELD OF THE INVENTION

The present invention relates to a method of and apparatus for counting objects, e.g. persons, present within a given area on the basis of observing their acceleration and deceleration, the movements of the objects being followed by the aid of at least one Doppler radar by observing the Doppler frequencies of signals reflected from the objects.

DESCRIPTION OF THE PRIOR ART

From the Finnish patent application No. 800954 there is already known a system, based on Doppler radar, for counting of the number of persons waiting in front of an elevator door. In this prior art system, however, two radar signals are used to count only the number of persons slowing down at the relevant area, by observing rather coarsely subdivided velocity ranges and with the aid of mathematical models. The system is better usable if, in counting the objects at a certain location, the objects starting to move can also be taken into account without involving ever more complicated mathematical models and assumptions, which tend to increase the error in the results of the counting.

BRIEF DESCRIPTION OF THE INVENTION

It is accordingly an object of the present invention to achieve a marked improvement in prior art Doppler radar object-counting systems by devising a simple, accurate and favorably priced system for counting moving objects.

According to the present invention, there is provided a method of counting objects present within a predetermined area by detecting acceleration and deceleration of the objects, e.g. from and to a stationary condition, comprising the steps of utilizing at least one Doppler radar to sense the movements of the objects by monitoring the Doppler frequencies of signals reflected from the objects, amplifying the Doppler signal reflected from each of the objects to provide an amplified signal, effecting an automatic gain control of the amplified signal to provide a signal of substantially constant strength independent of the distance and size of the respective object, detecting a frequency variation of the constant strength signal as an indication of change in the speed of movement of a respective one of the objects, determining whether the constant strength signal represents an acceleration or deceleration of the respective object, and correspondingly modifying a count representing the number of the objects in the predetermined area.

It is possible, by means of the present method, to measure reliably movements, e.g. of people, of different types, such as their stopping and setting off, within the predetermined area, e.g. an elevator lobby. The method is based on the use of a single Doppler radar, whereby an economically, functionally and structurally reasonable overall design may be obtained.

The present invention further provides apparatus for counting objects present in a predetermined area by detecting acceleration and deceleration of the objects, e.g. from and to a stationary condition, comprising at least one Doppler radar for detecting Doppler frequencies of signals reflected from the objects, means for amplifying the Doppler signal reflected from each of the objects to provide an amplified signal, means for effecting automatic gain control of the amplified signal to provide a signal of constant strength, frequency responsive means for detecting a frequency variation of the constant strength signal as an indication of change in the speed of movement of a respective one of the objects and determining whether the constant strength signal represents an acceleration or deceleration of the respective object, and means for correspondingly modifying a count representing the number of the objects in the predetermined area.

BRIEF DESCRIPTION OF THE DRAWINGS

Further objects, features and advantages of the invention will be more readily apparent from the following description thereof taken by way of example with reference to the accompanying drawings, in which.

DESCRIPTION OF THE PREFERRED EMBODIMENT

Figure 1:
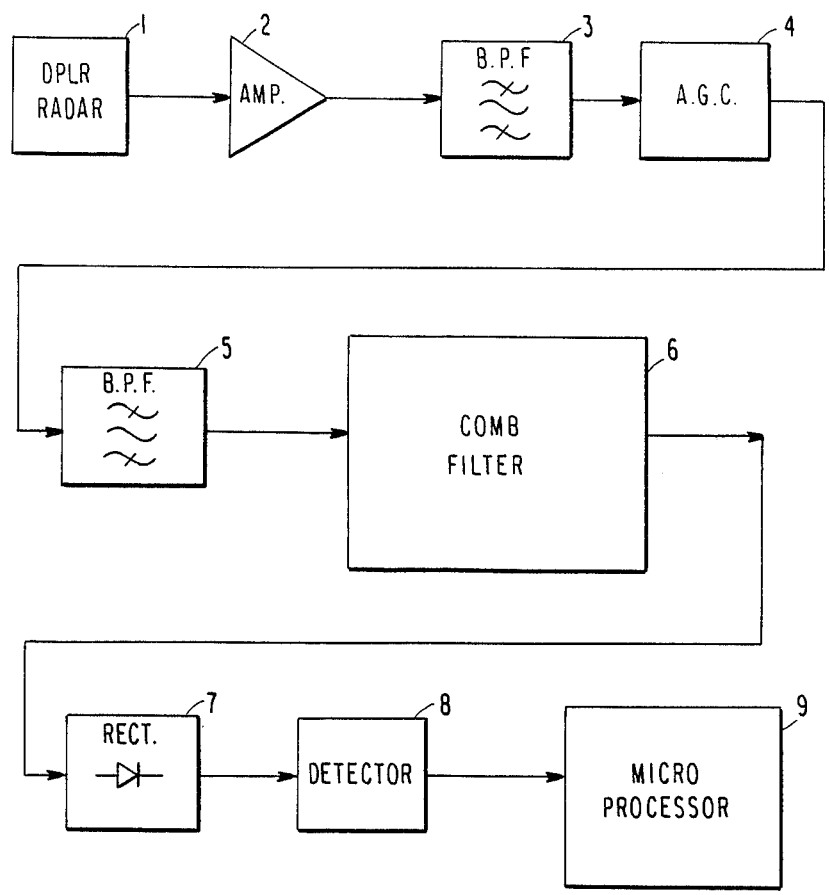
FIG. 1 illustrates in the form of a block diagram, an apparatus for implementing the present method of counting.

It is assumed in the following that a Doppler radar is being used to count the number of persons in front of an elevator door. A signal from the Doppler radar 1, in FIG. 1, is amplified in amplifier 2 and conducted to analog band pass filter 3.

In this embodiment, the radar operates in the GHz range, e.g. with a frequency 24 GHz, but Doppler radars have been designed for virtually any conceivable frequency ranges and also for waves other than electromagnetic, such as ultrasonic radars, for instance.

The signal obtained from the band pass filter 3 is passed to an automatic gain control unit 4, which corrects the signal so that it is independent of the radar/object distance and of the object size. This is simply accomplished by amplifying the strongest radar signal received to the same level at all times. The signal from each moving person is processed in its turn, because persons who have stopped at one point may be disregarded.

From the automatic gain control unit, the signal is conducted through a digital band pass filter 5 to a filter bank comprising a plurality of narrow-band filters, or a so-called comb filter 6.

Figure 2:
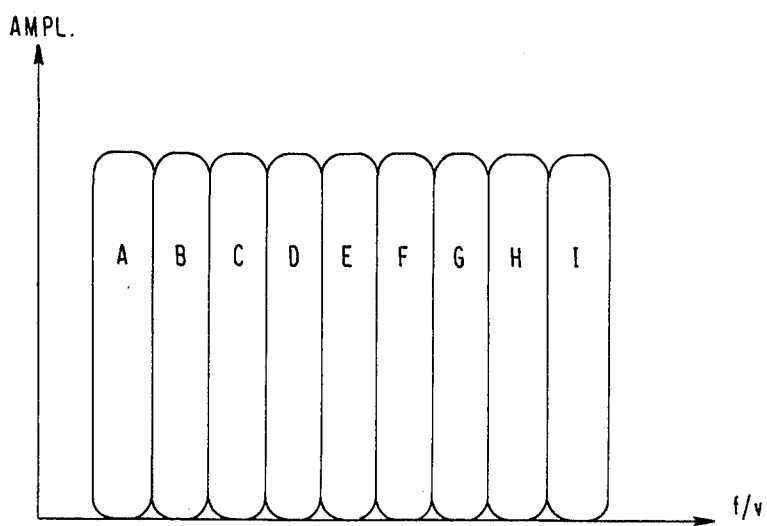
FIG. 2 illustrates the structure of a narrow-band filter.

It is thus understood that the frequency band 12 (FIG. 4) is in this embodiment subdivided into a plurality of narrow frequency bands A–I (FIG. 2), whereby examination of the amplitudes occurring in different frequency bands and of their transition in the course of time from one band to another enable the value of a person's acceleration or deceleration to be determined.

The filter bank consists of a freely selectable number of narrow-band filters which, in aggregate, span the velocity range from 0.1 to 1.0 m/s. Four to sixteen of such narrow frequency bands, or channels, may, for example, be provided within the desired frequency range (5–35 Hz). The filter bank may be implemented in a number of different ways; in the present embodiment, by way of example, a modern design is employed in which the narrow-band filters are obtained by programming in the signal processor a 2-complementary filter bank composed of all-pass filters connected in parallel. The theory of this kind of filter has been known since the early 1980's and, in view of its complexity, it is not described more closely herein. Suffice it to observe that in this way sharply delimited frequency channels are easily obtained, although certainly they may also be implemented by using conventional filters.

The outgoing signal from the filter bank, consisting of consecutive samples of the signal in each frequency channel A–I, transmitted at the pace determined by microprocessor 9, is in the present embodiment a 30–40 Hz pulsating a.c. voltage, which is full-wave rectified in rectifier 7 and thence conducted to detector 8.

The detector 8 is a low pass filter by which are filtered off all but the component changing at about 3–5 Hz frequency, which represents the amplitude in the radar signal changing with time and thus contains information relating to the persons' movements. This signal is further conducted to the microprocessor 9, by the aid of which the signal coming from the detector 8 is interpreted and conclusions are drawn as to the acceleration or deceleration of the moving object, and the number of stationary objects is updated.

The radar signal may also be frequency analyzed, in which case a time-domain signal is used for the starting point and this signal is transformed into the frequency domain, applying a mathematical transformation. In the exemplary case, in which a Fourier transformation is applied, the filter bank algorithm programmed in the signal processor is replaced by another algorithm which constitutes calculators performing the Fourier transformation, and these in aggregate span the whole frequency band under consideration. The Fourier transformation is not equally as good in acceleration and deceleration analysis as the filter bank, but on the other hand the Fourier transformation is better for stationary signals than the filter bank, which gives a more indefinite picture of the signal's frequency contents.

Figure 3:
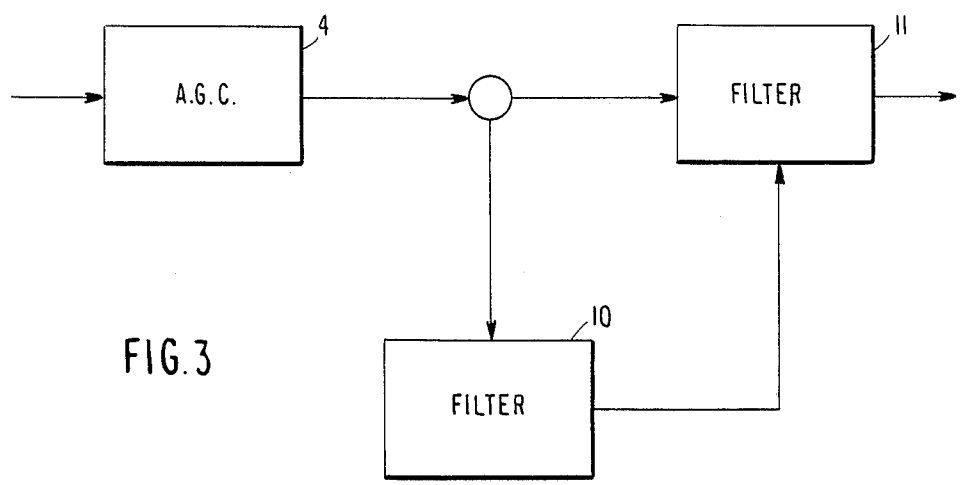
FIG. 3 illustrates, in the form of a block diagram, means for automatically following and correcting gain control of a signal with reference to desired frequency ranges.
Figure 4:
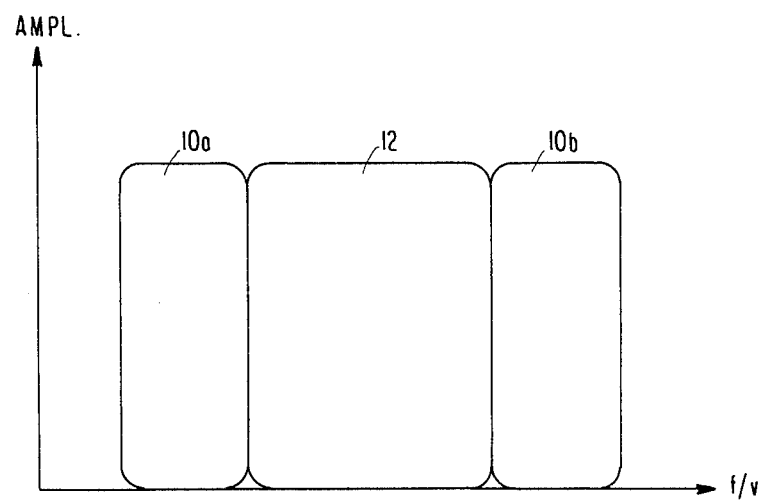
FIG. 4 illustrates the locations of frequency bands used in correcting the amplitudes of signals in a frequency range under examination.

In those cases in which the operation of the automatic gain control unit is influenced by a strong frequency component which is immediately outside the frequency range of interest, it is to be expected that the signal obtained from the Doppler radar of a proper object is attenuated as the control unit 4 concentrates on amplification of the interference signal. In order to prevent this, it is possible, as shown in FIG. 4, to examine frequency ranges 10a and 10b located immediately above and below the desired frequency band 12, and if in the frequency ranges 10a and 10b there is obtained a signal of greater strength than from the frequency range or band under examination, the signal of the frequency range under examination may be corrected by the arrangement shown in FIG. 3, in which the output of the automatic gain control unit 4 is sensed by means of high and/or low-pass filters 10 relative to the frequency band under examination so that if strong signals are observed in these, the presumably attenuated signal from the frequency band 12 under examination is passed through a filter 11 consistent with the dynamics of the automatic gain control unit 4, which thus gives the right signal its correct value. The interference signals are efficiently eliminated in the accurate digital band filter 5.

In this way it is possible to correct the properties of the automatic gain control in those cases in which its operation is affected by a strong frequency component outside the frequency range which is of interest. It is usually sufficient in practice if the frequencies above the frequency band 12 are monitored.

There has thus been described a system which detects persons appearing, e.g., in front of an elevator door, and for each such person who decelerates and stops, the number of persons waiting for the elevator is incremented by one. If a person goes away from the area in front of the door, the number is decremented by one.

When a radar apparatus according to the invention is installed on every floor to which the elevator runs, the control system of the elevator, or elevator group, is enabled to conclude on the basis of the numbers at each floor which of the floors present the greatest need for elevator service, and it may thus increase the speed of elevator service by optimizing the sequence in which the calls are served. Various signalling systems from the floors to the central computer directing the elevator as well as various optimizing algorithms are well-known in elevator technology and a more detailed description thereof is therefore omitted.

It will be apparent to those skilled in the art that different embodiments of the invention are not confined to the examples presented in the foregoing and that, instead, they may vary within the scope of the claims presented below.

We claim:

1. A method of counting objects present within a predetermined area by detecting acceleration and deceleration of said objects, comprising the steps of:
utilizing at least one Doppler radar to sense movements of said objects by monitoring Doppler frequencies of signals reflected from said objects;
amplifying the Doppler signal reflected from each of said objects to provide an amplified signal;
effecting an automatic gain control of said amplified signal to provide a signal of substantially constant strength independent of a distance and a size of the respective object;
detecting a frequency variation of said constant strength signal as an indication of change in a speed of movement of a respective one of said objects;
determining whether said constant strength signal represents an acceleration or represents a deceleration of the respective object;
correcting the automatic gain control of said amplified signal, at least in respect of interference signals occurring immediately above a frequency range under examination, by filtering and detecting said constant strength signal in a frequency band above said frequency range under examination and correcting said constant strength signal in said range under examination according to said filtered and detected constant strength signal; and
correspondingly modifying a count representing a number of said objects in said predetermined area according to said determined acceleration and deceleration.

2. A method according to claim 1, in which the detection of the frequency variation comprises employing filter means for subdividing a frequency band of said constant strength signal into a plurality of narrow channels and determining a speed change of the respective object, and wherein said determining step determines whether said speed change represents said acceleration or deceleration from a filtered output of said filter means.

3. A method according to claim 1, in which the detection of the frequency variation is performed by means of a mathematical transformation of said constant strength signal to determine the speed change of the respective object and whether said speed change represents an acceleration or deceleration of the respective objects.

4. Apparatus for counting objects present in a predetermined area by detecting acceleration and deceleration of said objects, comprising:
at least one Doppler radar for detecting Doppler frequencies of signals reflected from said objects;
means for amplifying a Doppler signal reflected from each of said objects to provide an amplified signal;
means for effecting automatic gain control of said amplified signal to provide a signal of constant strength;
high band filter means (10b) responsive to frequencies immediately above a predetermined range of frequencies of said constant strength signal for detecting interference; and
correction filter means (11) responsive to said highband filter means and consistent with dynamics of said automatic gain control means for effecting correction for said interference in said predetermined range of frequencies;
frequency responsive means for detecting a frequency variation of said constant strength signal as an indication of change in a speed of movement of a respective one of said objects and determining whether said constant strength signal represents an acceleration or represents a deceleration of the respective object; and
means for correspondingly modifying a count representing a number of said objects in said predetermined area according to said determined acceleration and deceleration.

5. Apparatus according to claim 4, wherein said frequency responsive means comprise a plurality of narrow band filters (A-I).

6. Apparatus according to claim 4, wherein said frequency responsive means comprise programmable means (9) for processing said constant strength signal, said programmable means being programmed to serve as a 2-complementary filter bank comprising a plurality of all-pass filters connected in parallel.

7. Apparatus according to claim 4, wherein said frequency responsive means comprise programmable means for processing said constant strength signal, said programmable means being programmed to perform Fourier transformations.

8. Apparatus according to claim 4, wherein said frequency responsive means include low pass filter means (8) for providing a low frequency signal representing an amplitude change in said Doppler signal.

9. Apparatus according to claim 4, further comprising a microprocessor implementing said count modifying means.

10. Apparatus according to claim 8, further comprising a microprocessor implementing said count modifying means.

* * * * *